United States Patent [19]

Field, II

[11] 3,956,650

[45] May 11, 1976

[54] LAMINAR-ROTOR SYNCHRONOUS INDUCTOR MOTOR

[75] Inventor: John H. Field, II, Needham, Mass.

[73] Assignee: Sigma Instruments Inc., Braintree, Mass.

[22] Filed: June 26, 1972

[21] Appl. No.: 266,421

[52] U.S. Cl. ............................ 310/156; 310/49 R; 310/162
[51] Int. Cl.² ........................................ H02K 21/14
[58] Field of Search .......... 310/162, 163, 166, 49 R, 310/113, 114, 262, 263, 266, 268, 156

[56] References Cited
UNITED STATES PATENTS

| | | |
|---|---|---|
| 3,062,979 | 11/1962 | Jarret et al. ........................... 310/163 |
| 3,293,460 | 12/1966 | Iwai et al. ........................... 310/49 R |
| 3,469,131 | 9/1969 | Stellwagen ........................ 310/156 X |
| 3,470,408 | 9/1969 | Lewis et al. ........................... 310/156 |
| 3,614,496 | 10/1971 | Schiethart ............................ 310/162 |

*Primary Examiner*—J. D. Miller
*Assistant Examiner*—Robert J. Hickey
*Attorney, Agent, or Firm*—Toren, McGeady and Stanger

[57] ABSTRACT

The rotor structure of a synchronous inductor motor, such as a stepping motor, is of a compact, simplified and high-efficiency construction consisting essentially of wholly planar annular laminations which include stacks of thin externally-toothed elements bonded together and with relatively thin axially-magnetized annular washer material extending radially from a relatively large central shaft fully to the roots of the stack teeth.

8 Claims, 4 Drawing Figures

U.S. Patent May 11, 1976 3,956,650
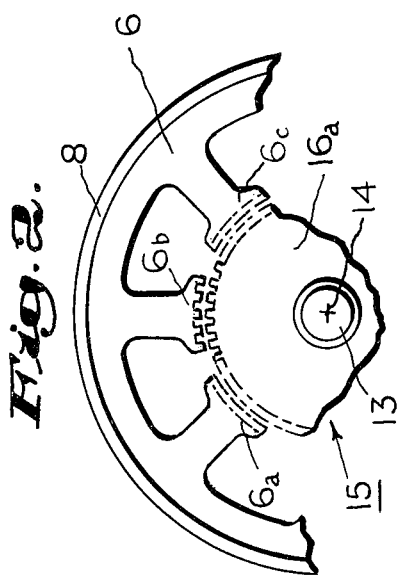
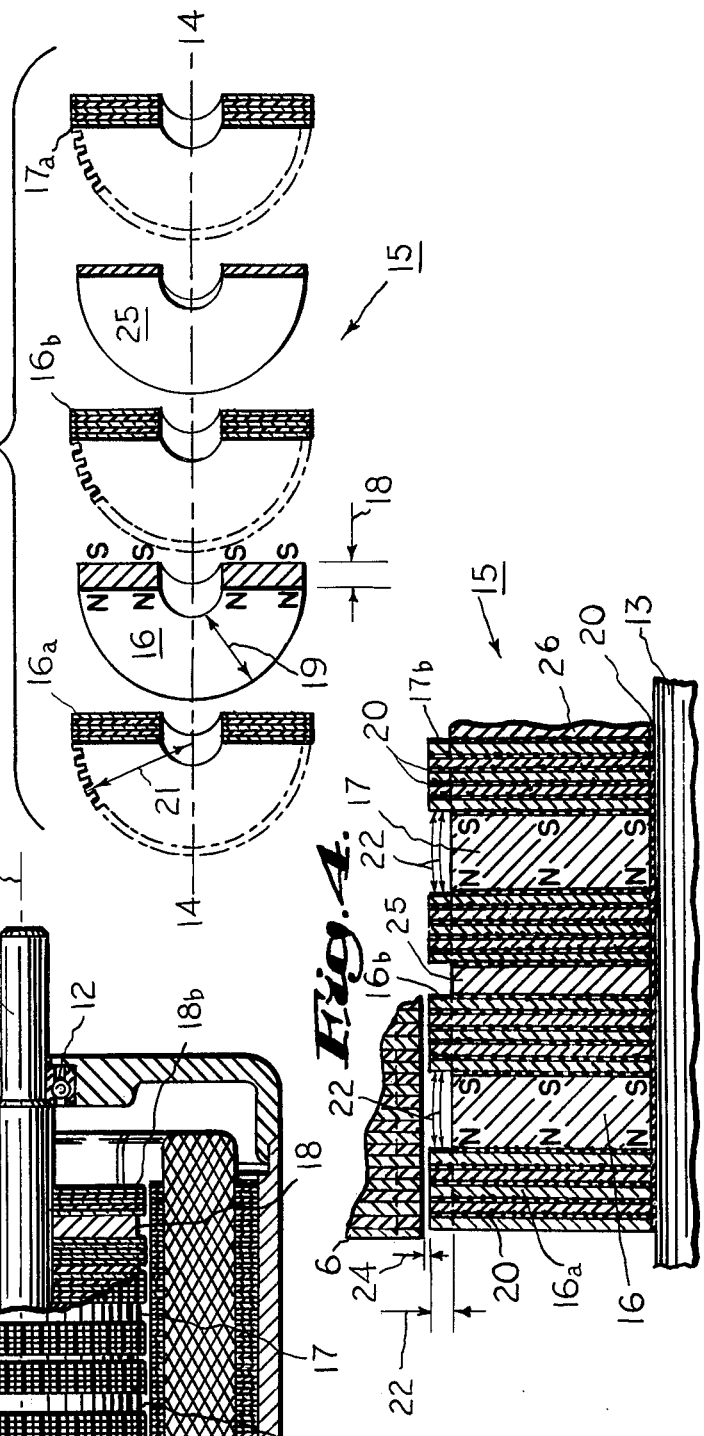
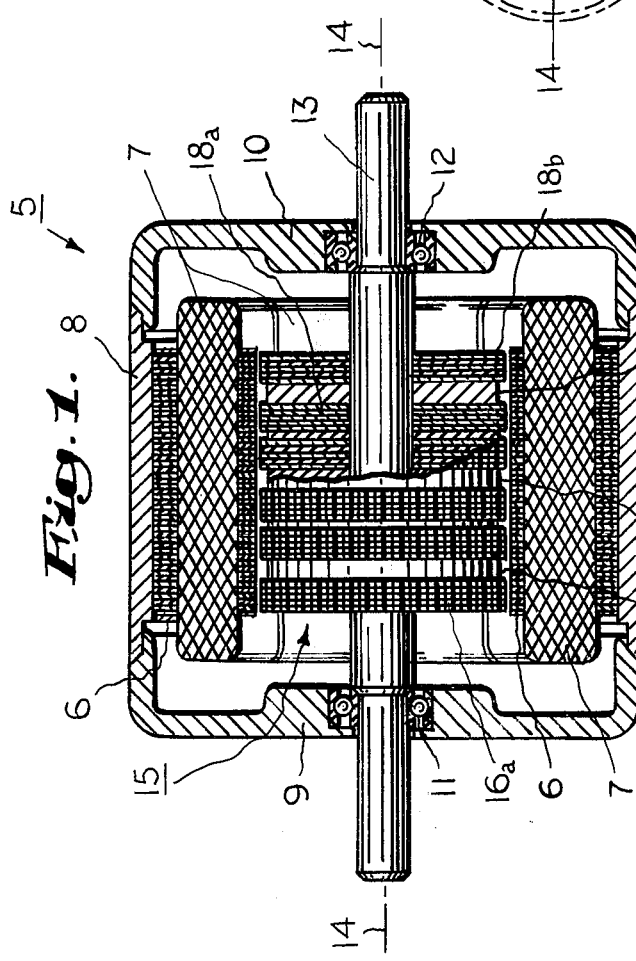
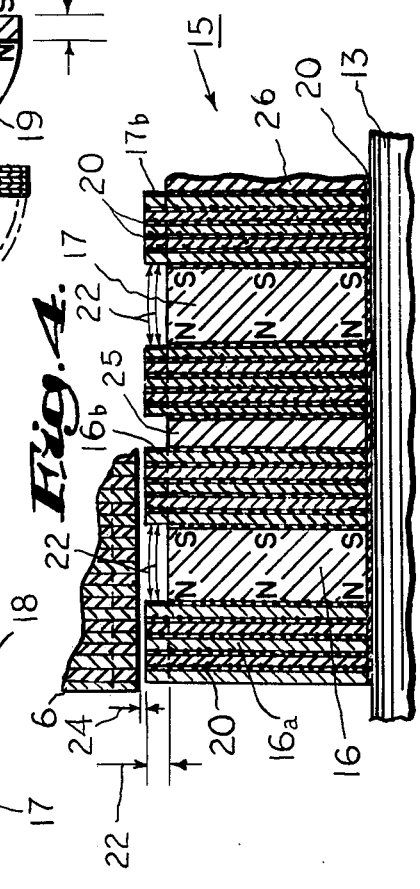

LAMINAR-ROTOR SYNCHRONOUS INDUCTOR MOTOR

BACKGROUND OF THE INVENTION

Electrical synchronous inductor motors, including windingexcited internally-toothed stator poles in surrounding relation to permanently-magnetized externally-toothed rotor structures, have come into extensive use largely because of their precision high-speed synchronous and stepping or indexing capabilities. As is well know, the permanent and electromagnetic magnetic fields which cause the attraction and repulsion effects developed in such motors, and which account for their unique operating characteristics, are directed by the toothed stator pole faces and by the toothed rotor peripheries. Construction of the rotor assembly is of particular importance in such motors, because rotor inertia is critical in determining many of the uses which the motor can serve, because so-called "iron losses" and attendant heating in the rotor so greatly influence the frequency and speed capabilities of the motor, because the amount of distribution of permanent-magnet material in the rotor have such controlling effect in determining the efficiency and torque characteristics of the motor, and because the configurations and the assembly interrelationships of both the magnetic and permanently-magnetized materials of the rotor further govern manufacturing costs, overall motor size and weight, and flexibility in the fabrication of different-length models of the same basic design for purposes of developing different output characteristics.

Generally, the permanent-magnet element of synchronous inductor motors has been in an elongated cylindrical form which is best suited to the intended axial magnetization of most common magnet materials. Collaterally, in efforts aimed at a space-conserving arrangement of the needed toothed pole pieces for such elongated magnets, these end pole pieces have been folded back over the magnet ends, after the fashion of face-to-face cups. The axially-extending peripheral teeth on such pole pieces have in this way been permitted a desirable long length without at the same time increasing the overall length of the rotor and entire motor, but this has been at the related expense of serious inefficiency, particularly the inefficiency resulting from magnetic leakage or shunting effects between the magnet and the closely-spaced enshrouding material of the cup-shaped pole pieces. Compensatory increases in the radial spacing between the magnet and its surrounding pole pieces would only undesirably enlarge the rotor, further increase its inertia, and lengthen lossy flux paths.

Flux-conducting magnetic material of the rotor structures in synchronous inductor motors tends to develop more severe heating and iron losses as the excitation frequencies and speeds and increased, of course. Laminations represent one means for suppressing such losses in many types of electromagnetic devices, and have proposed for use in these rotor structures also, as is shown in U.S. Pat. Nos. 2,105,514 and Re. 25,445, for example. However, rotor laminations pose structural-integrity problems which detract from their effective use in fabrication of thin portions of the aforementioned cup-shaped pole pieces, and, as a result, have instead been mounted around such pieces as radially-thick cylindrical sleeves which unavoidably produce unwanted increases in both inertia and radial size.

The present invention relates to improvements which benefit efficiency, torque, and economy of manufacture of synchronous inductor motors, and in one particular aspect, to novel and improved rotor units for such motors which are wholly laminar, are of relatively short axial length, suppress leakage of magnetic flux, lend themselves to efficient uses at high frequencies and rotational speeds, and are of relatively simple and yet rugged form suitable for low-cost production. The annular permanent-magnet elements utilized in the improved rotor units have relatively small ratios of axial to radial thicknesses, which may be not in excess of 1:3, and in this respect are quite the opposite of the usual elongated cylindrical magnet. Moreover, the toothed magnet pole pieces associated in end abutments with the thin permanent magnet are likewise axially thin, each being made up of a plurality of identical planar annular lamination sheets of magnetic material. The laminated pole pieces exhibit no axial overhang whatsoever in relation to the thin magnet, and the annular magnet extends radially fully out to the roots of the teeth formed on the peripheries of the pole pieces, for optimum utilization of material and minimized flux leakage. In this type of construction, the face areas of the pole pieces and magnet are ample enough to accommodate use of a relatively large and strong non-magnetic central shaft without undue compromise of magnetic characteristics, such as can be the case with conventional rotor designs. Preferably, all of the pole piece laminations are bonded together in sandwiching relation with the thin permanent magnet by thin layers of a cement such as an epoxy, and their assembly is secured to the shaft in the same manner, such that glued surfaces are of desirably broad area and of resulting high strength. Further, the washer-shaped laminations and magnet advantageously transmit substantially all major forces in direct relation to the shaft, thereby avoiding "facturing" tendencies under conditions of high-speed and other rigorous uses. The short axial lengths of rotor units which can be realized in accordance with these teachings in turn facilitate the doubling, tripling, etc., of such units end-to-end on a single shaft, such that, in cooperation with one form of stator which has also been suitably lengthened, one basic motor configuration can yield corresponding multiples of power output.

SUMMARY OF THE INVENTION

By way of a summary account of practice of this invention in one of its aspects, an electrical synchronous inductor motor, including a conventional multi-winding stator in association with multiple internally-toothed poles, is equipped with a high-efficiency low-leakage rotor unit in which the rotor shaft supports a thin annular axially-magnetized permanent-magnet washer disposed between and in abutting endwise relation to a pair of identical lamination-stack pole pieces made up of yet thinner planar laminations of magnetic material. The latter stacks exhibit equally-spaced axially-extending peripheral teeth which, in accord with conventional practices, may be angularly displaced from one another by one-half a tooth pitch in the two stacks, and are of a predetermined number in relation to the number of the stator teeth which would occupy a full circular array. Insulating cement, such as an anaerobic epoxy, appears in thin broad-area bonding layers securing the laminations, thin magnet and shaft together solidly in the absence of any other fastening provisions and without the significant eddy-current losses which would attend uses of metallic fasteners. Material of the thin permanent magnet extends radially from the central shaft fully to the roots of the external teeth of the pole-piece laminations. In multiple-rotor designs, two or more of such rotor units are bonded end-to-end on the same shaft, with thin non-magnetic spacers, which can be of even lesser thickness than the thin permanent magnets, disposed between adjacent units.

One of the objects of the present invention is the provision of unique and improved electrical synchronous inductor motors wherein efficiency, torque, compactness and strength are enhanced by wholly laminar rotor units each consisting of a thin axiallypolarized magnet secured to externally-toothed end pole pieces which are each wholly planar and formed of a plurality of laminations of magnetic material.

Another object is to provide a synchronous inductor motor having low-cost, simplified, ruggedized and versatile constructional characteristics as well as exhibiting improved leakage and heightened effectiveness in uses of magnetic materials, as the result of a rotor fabrication involving planar laminae for the stacked permanent-magnet, pole-piece and spacer elements, the permanent-magnet element being substantially unshunted by pole-piece material of the rotor and being in optimized broadarea end abutments with the pole pieces.

BRIEF DESCRIPTION OF THE DRAWINGS

Although the features of this invention which are considered to be novel are expressed with particularity in the appended claims, further details as to preferred practices and embodiments and as to the further objects and features thereof may be most readily comprehended through reference to the following description taken in connection with the accompanying drawings, wherein:

FIG. 1 is a partly cross-sectioned and partly brokenaway side view of a synchronous inductor motor embodying the present invention;

FIG. 2 provides a fragmentary end view of stator and rotor lamination assembly such as that of the motor of FIG. 1;

FIG. 3 depicts rotor laminae of the motor of FIGS. 1 and 2, in an exploded cross-sectional relationship; and FIG. 4 is an enlarged cross-sectioned side view of portions of the stator and rotor units of the motor shown in FIG. 1.

DESCRIPTION OF THE PREFERRED EMBODIMENTS

Having reference to the drawings, wherein the same reference characters designate identical or functionally-corresponding parts throughout the several views, and, in the first instance to FIG. 1 thereof, there is illustrated an electrical synchronous inductor motor 5 having the usual stator assembly in which an elongated stack of generally annular stator laminations 6, threaded axially by conductors of associated stator windings 7, is supported within a casing 8. The latter casing is in turn cooperates with a pair of end caps, 9 and 10, which mount the usual bearings, 11 and 12, accommodating rotation of the central rotor shaft 13. Shaft 13 is shown double-ended, for mechanical output connections at either side, about the longitudinal axis 14—14. Windings 7 are electromagnetically coupled with the stator laminations and excite the several discrete pole faces, 6a, 6b, 6c, etc., in FIG. 2, in a conventional manner, such as in response to quadrature-related A.C. electrical signals or in response to logic-dictated pulse signals. Inner peripheral surfaces of these stator pole faces are toothed, with the teeth running longitudinally of the motor structure, the stator lamination stack and teeth being as long as required to interact with single, double or other multiples of rotor units which may be used.

The cooperating rotor structure, 15, is likewise peripherally toothed, externally, the teeth being of uniform size and angular distribution and bearing a predetermined known relationship to the inner teeth of the surrounding stator pole faces. As illustrated in FIG. 1, the rotor structure is of a "tripled" multiple form involving three like rotor units in end-to-end stacked and closely-spaced axial relation to one another along the supporting rotor shaft 13; their combined length does not exceed, and is preferably just slightly less than that of, the axial length of the surrounding stator lamination stack 6. Multiple rotor units of course function to develop larger output torques than could be realized with a single rotor unit, albeit at the expense of the expected larger consumption of electrical input power, and represent a design technique which has long been known in the art and is described in U.S. Pat. No. 2,834,896, for example. However, the rotor units disclosed herein are intrinsically of highly compact axial length and may therefore be stacked in high-torque multiples without unduly increasing either the overall motor lengths or, very importantly, the related bulk of stator structures which must be used with them.

The aforesaid compactness of rotor units results from the facts that the rotor permanent magnets used to polarize the structure are in thin wafer or washer form, that the toothed pole pieces abutted with the two sides or ends of the permanent-magnet washer consist solely of stacks of wholly planar laminations of magnetic material which may be made relatively thin, that the spacers between stacked rotor units may be kept very thin because of the efficiency of the magnetic circuitry involved, and that the thin permanent-magnet washer and its associated pole pieces do not overhang and therefore develop little leakage despite their thinnesses. Permanent-magnet washers 16, 17 and 18 in FIG. 1 are each of only small axial thickness, 18 (FIG. 3), in relation to their diameters and to their radial thickness 19 (FIG. 3); typically, the thickness-to-radius ratio is not in excess of about 1:3. In one suitable construction, for example, a permanent-magnet washer was of about 0.2 inch thickness and about 9/16 inch radial thickness and was associated with a rotor shaft of about 13/32 inch diameter. As is evidenced by the N-S markings in FIG. 4, these permanent-magnet washers are magnetized axially, and, preferably, the magnetic polarization of adjacent units is of the same sense. Permanent-magnet materials which lend themselves well to polarizations in direction opposite to their direction of geometric elongation include such materials as ferrites, cobalt-platinum alloys, rare-earth-cobalt alloys, Alnico 8, Alnico 9, and the like. Costs of such magnets are advantageously offset by the relatively small amounts which need to be used, and any shaping or like mechanical problems which might normally be encountered with such materials are largely avoided because of the simple annular circularities and flatness of the washers and because gluing rather than stress-concentrating mechanical fasteners is preferably exploited throughout. The gluing advantageously occurs over broad surface areas of the laminar structure, and therefore assures that the rotor will possess outstanding structural integrity, even under high-speed and other rigorous operating conditions. The mechanical properties are also improved because the laminar elements all extend fully inward to the rotor shaft which is in turn capable of sustaining the most severe forces likely to be encountered. An all-glued embodiment is much preferred over comparable riveted or welded designs because the latter unavoidably entail significant power losses due to eddy-current flows in the welds or rivets.

For the usual purposes in motors of the type under discussion, the rotor permanent-magnet elements must each be associated with ecternally-toothed pole pieces; in this instance, magnet 16 is abutted with pole pieces 16a and 16b, magnet 17 with pole pieces 17a and 17b, and magnet 18 with pole pieces 18a and 18b. Each of such pole pieces consists solely of a stack of thin, planar and substantially annular laminae of magnetic material; typically there may be about twenty laminations in a stack which is up to two times the axial length of the magnet, and each wholly flat lamination may even be as thin as about 0.004 or 0.006 inch. Cement, 20, bonds the laminations together in exceedingly thin layers, which are shown in exaggeration in FIG. 3 and are squeezed very thin by application of pressure during curing. The same cement bonds the magnets, and pole pieces, and certain spacers 21, and shaft 13, together as a solidly-integrated rotor assembly. An anaerobic epoxy cement serves the bonding function very well, and may comprise an epoxy such as those sold under the commercial trade names Loctite or Bondmaster, for example. In the same embodiment considered hereinabove, each of the laminated rotor pole pieces has a thickness of but about 0.256 inch, which is in excess of that of the associated thin magnet-washer. Importantly, the larger radial dimension 21, from the outside of the pole-piece teeth to the center of each pole piece is greater than the radius of the adjacent permanent magnet by only a tooth height 22, such that the periphery of the magnet extends fully out to the roots of the pole-piece teeth; typically the difference is about 3/64 inch. Because these teeth have no overhang of the magnet whatsoever, the leakage flux between the teeth and magnet is kept exceedingly small; this permits the magnet to be made very thin, without serious loss of effective strength such as would occur if the pole pieces were cup-shaped and extended back over the magnet as in prior constructions. Some fringing flux does tend to be shunted along paths such as those of flux lines 22 in FIG. 4, but there is only very little void for this to appear in, inasmuch as the magnet fills all spaces out to the roots of the pole-piece teeth. Moreover, the radial gap 24 between rotor and stator is kept small enough, in relation to the axial gap 18 which is posed between pole-piece teeth by presence of the magnet-washer, to insure that almost all the magnetic flux witnesses preferred low-reluctance paths of travel through the axial gap between teeth of cooperating rotor pole pieces. Likewise, the areas for accommodating possible leakage flux between the exterior of the magnet and the interior of the stator are significantly reduced, and a maximum of the magnetic flux is tooth-directed and aids in developing torques and/or locking effects, as intended.

It will be appreciated also that the laminar construction under discussion is one which affords an optimum magnet end-face area in abutting relation to its pole pieces, and that the latter therefore need not be as thick axially as might otherwise be the case. Moreover, needed material removals; such as that accommodating a relatively large-diameter shaft 13 for a high-torque motor, do not as seriously affect the magnetic characteristics of the rotor nor require that the pole pieces be made much thicker to offset the losses of effective magnet and pole-piece material. Similarly, the aforementioned magnet-circuitry efficiencies inherent in the constructions of each rotor unit in turn enable the non-magnetic spacer washers 25 and 26 between the adjacent rotor units to be kept very thin as well, with consequent savings in rotor inertia, stator bulk, and overall length of mulitple-rotor motors. The spacer washers may be less than half the thickness of the magnet washers in the embodiment which has been discussed as to dimensions, for example. As is common, the teeth on cooperating oppositely-polarized rotor pole pieces may be angularly offset from one another, by one-half a tooth pitch, for example.

It should be understood that the specific practices and preferred embodiments herein referred to have been discussed in the context of disclosure rather than essential limitation, and that various modifications, additions and substitutions may be effected by those skilled in the art without departure from these teachings; it is therefore aimed in the appended claims to embrace all such variations as fall within the true spirit and scope of this invention.

What I claim as new and desire to secure by Letters Patent of the United States is:

1. A motor comprising a stator having a plurality of radially projecting teeth, a rotor mounted within said stator for rotation about an axis, said rotor including a plurality of wafer-shaped lamina having peripherally arranged teeth opposing the radially projecting teeth of said stator, a wafer-shaped axially magnetized permanent magnet arranged adjacent said lamina, a second plurality of wafer-shaped lamina sandwiching the permanent magnet between the second plurality of lamina and the first plurality of lamina, said second plurality of lamina having a plurality of radially projecting teeth spaced from the radially projecting teeth on said stator, a wafer-shaped magnetic spacer coaxially adjacent said second plurality of lamina, a third plurality of lamina coaxially adjacent said spacer and having a plurality of peripherally arranged teeth extending radially, a second axially magnetized permanent magnet coaxially adjacent said third plurality of lamina, a fourth plurality of lamina coaxially arranged adjacent said second permanent magnet and having a plurality of radially extending teeth, said lamina being formed of soft magnetic material so as to form pole shoes for said permanent magnets, said permanent magnets extending substantially to the roots of the teeth of said pluralities of lamina, said permanent magnets having a lesser axial dimension than radial dimension, said lamina each being thinner than the axial dimension than said permanent magnets, said lamina and said permanent magnets and said spacer being secured to each other by bonding means, the bonding means and the lamina and the permanent magnets and the spacer forming substantially the entire axial dimension between said first lamina and said fourth lamina, said spacer having an axial dimension smaller than the radial dimension and a radial dimension substantially equal to the radial dimension of said permanent magnets, said permanent magnet and said spacer being annular, said lamina being annular, each plurality of lamina being thicker than each magnet.

2. An electrical synchronous inductor motor as set forth in claim 1 wherein said rotor includes a shaft and said magnets and said lamina and said spacer are mounted on the shaft, each of said rotor pole pieces being of lesser axial than radial thickness and of uniform axial thickness and having a wholly planar and parallel end faces, and wherein the material of said magnet extends radially substantially fully between said shaft and the roots of said teeth of said pole pieces.

3. An electrical synchronous inductor motor as set forth in claim 2 wherein said binding means consists of cement bonding said rotor laminations and washer together and to said shaft.

4. A motor as in claim 1 wherein said permanent-magnet rotor washing has an axial-to-radial thickness not in excess of about 1 to 3, said rotor structure including a shaft and two units each consisting essentially of one of said permanent-magnet washers said pair of said laminar pole pieces in abutting relation to the opposite axial end surfaces thereof and mounted on the shaft, said units being substantially alike and correspondingly polarized and stacked collinearly on said shaft with the spacer of non-magnetic material between adjacent ones of said units, and the teeth of said stator structures being disposed on angularly spaced pole faces thereof and longitudinally encompassing all of said rotor units.

5. A motor as in claim 1, wherein said pole pieces and said magnet are composed of separate materials, said pole pieces having a higher permeability than said magnet.

6. A motor as in claim 1, wherein said lamina and said permanent magnets and said spacer form a structure having an axial dimension, said stator teeth extending axially and having an axial dimension at least as long as the axial dimension of said structure.

7. A motor as in claim 1, wherein said permanent magnets are arranged in north-south-north-south sequential relationship.

8. A motor as in claim 1, wherein a wafer-shaped spacer axially separates each of said units, said spacer being at least as narrow as one-half the thickness of one of said permanent magnets.

* * * * *